July 20, 1965
W. E. JACKSON ETAL
3,195,859
UNICYCLE LIFT
Filed Dec. 28, 1962
2 Sheets-Sheet 1
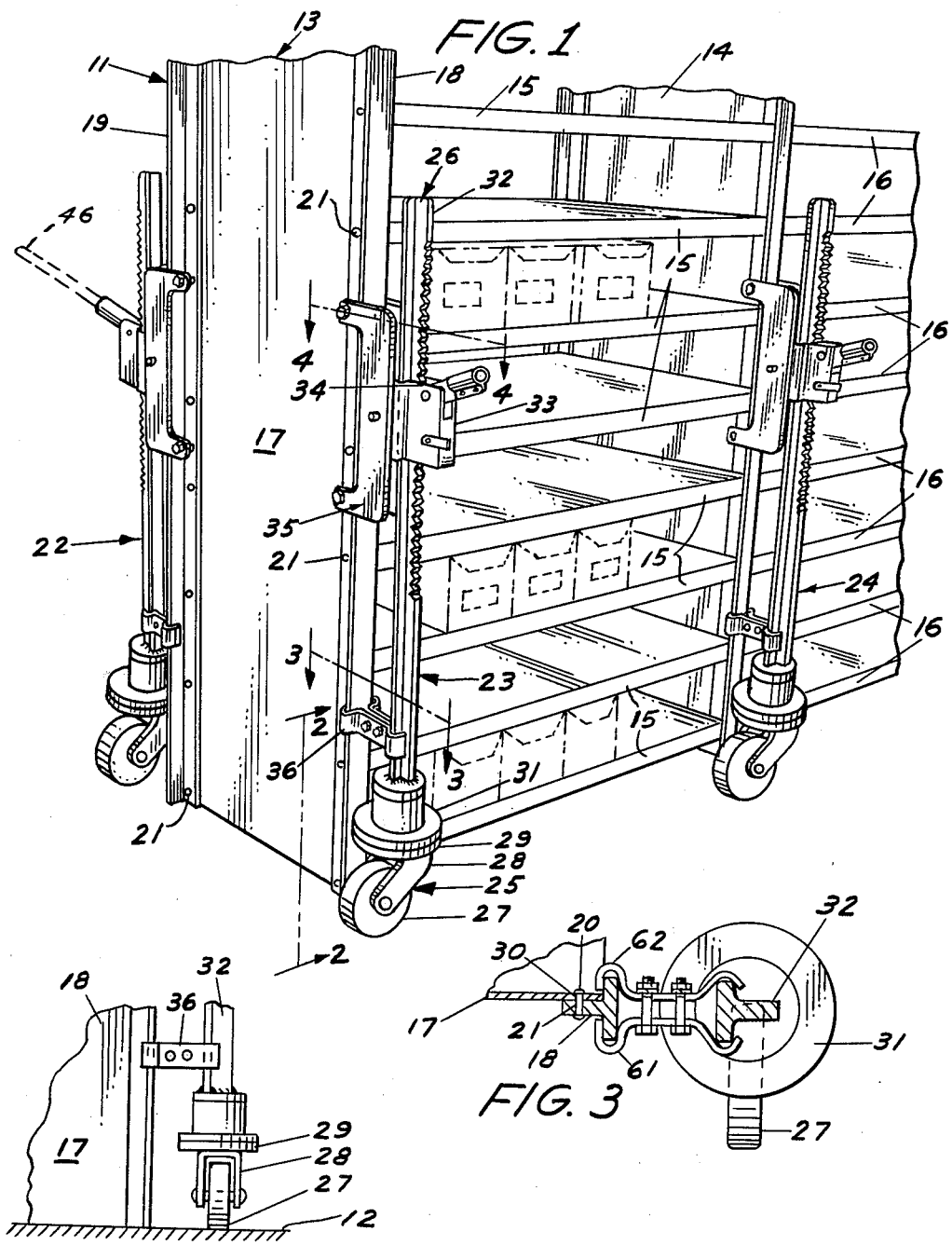
INVENTORS
WILLMAN E. JACKSON
WILLIAM T. JOHNS
BY J. R. Faulkner
O. B. Johnson
ATTORNEYS

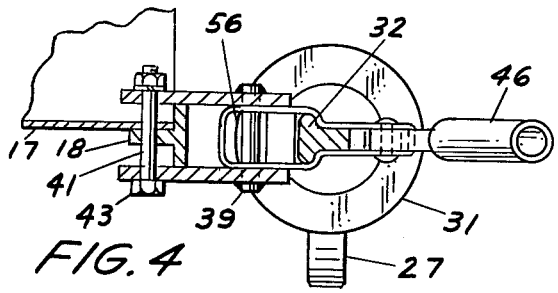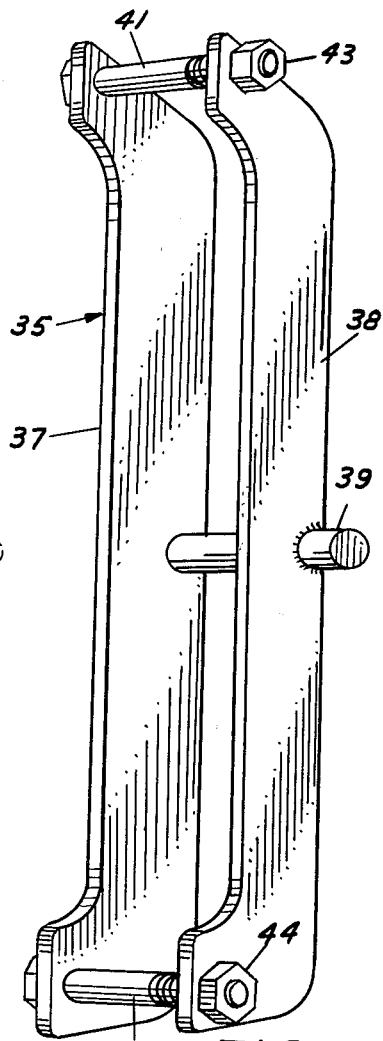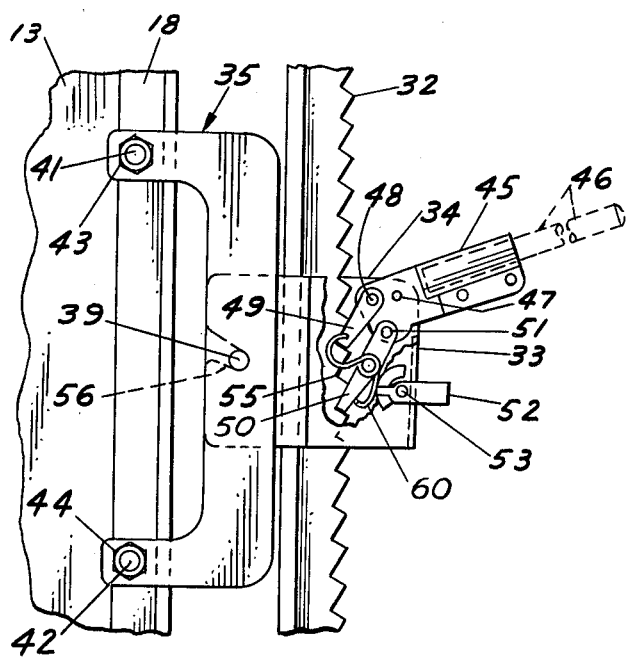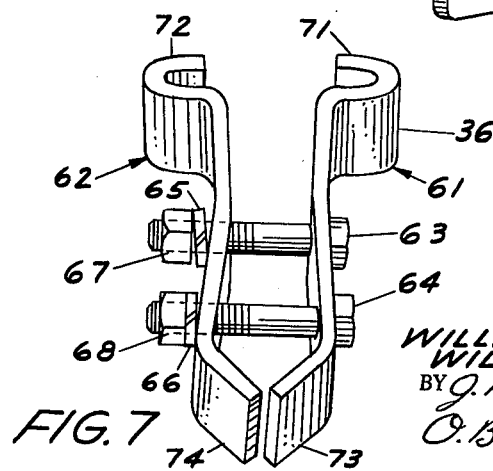

United States Patent Office 3,195,859
Patented July 20, 1965

3,195,859
UNICYCLE LIFT
Willman E. Jackson and William T. Johns, Romeo, Mich., assignors to Ford Motor Company, Dearborn, Mich., a corporation of Delaware
Filed Dec. 28, 1962, Ser. No. 248,114
4 Claims. (Cl. 254—2)

This invention is concerned with moving objects and a novel device for use in such movement. In particular, this invention relates to a novel device for use in lifting and transporting large and unwieldy objects the movement of which is facilitated by providing support at several points about their perimeter. More particularly, this invention relates to a novel device combining lift, roll, and support means and providing in multiple use a plurality of independent vehicles which can be positioned in accordance with the structural support requirements of the object to be moved.

In order to avoid unnecessary repetition in describing the many possible embodiments of and the many uses for the device of this invention, the invention will be discussed primarily in relation to the moving of compartmentalized structures or cabinets. The term "cabinets" is used herein to include metal or nonmetal structures the interior of which is divided by fixed or movable partitions into a plurality of compartments by shelving, trays, drawers, boxes, etc. Such cabinets are used extensively for holding or storing files, records, parts, and a variety of small articles too numerous to mention. Moving such cabinets, particularly those which comprise a series of connected sections or subunits, presents a variety of problems. The need for moving such cabinets from time to time provides one of the more important uses for the device of this invention. This use well illustrates the operation of this device, its unusual operative flexibility, and many of the other advantages inherent in its unusual design.

The difficulties encountered in moving compartmentalized structures are exemplified by the procedures currently employed in industrial plants in moving multisection stock bins and the stock therein. The following is a typical step-by-step procedure heretofore used when it became necessary to change the location of such bins.

(1) Remove stock from bins and place in containers for transporting to new location.
(2) Remove location cards from files to accompany stock to the new location.
(3) Tear down bins at the old location.
(4) Transport disassembled bins to the new location.
(5) Rebuild bins at the new location.
(6) Transport stock containers to the new location.
(7) Place stock in bins in new location.
(8) Update location cards to show new location of stock and file.

The device of this invention comprises lift means for raising the object to be moved and roll means pivotably connected with said first lift means and supporting the lift means when in use. This unicycle-lift is supported in an upright position by the object when in use. When not in use its compact nature facilitates storage. In a given instance the device of this invention is employed in separate but cooperative relationship with a number of like devices or units. This number will vary with the size and configuration of the object and will ordinarily constitute the number required to support the object in a stable, upright position together with a sufficient number at intermediate points to prevent sagging, if necessary. Thus, unless supplementary support is provided the number of units employed will never be less than three. Their employment is thus cooperative although no physical connection exists between the separate units. However, it should be understood that where the weight and configuration of the object permits, a single unit or a pair of units can be used to move an object with manual or other supplementary support.

The aforementioned lift means may comprise a conventional lifting jack with engaging means suitably designed for gripping the object to be moved. In addition to the aforementioned engaging means the jack comprises a vertical support member, load lifting mechanism, and base member. The load lifting mechanism may utilize ratchet, screw or hydraulic means for lifting. Of these the ratchet jack is preferred. The mechanism must be one that admits of operation in the position of engagement.

The aforementioned roll means may comprise a conventional caster associated with the aforementioned base member of the lift means. In a preferred embodiment this is a conventional single wheel caster the wheel of which is free to turn about an axis that is perpendicular to the axis of the wheel. This wheel or roller may comprise more than one section each of which is relatively closely spaced in relation to each other and rotates with or about a common axle between the axle-supporting legs of the caster so that all sections pivot together, e.g. the conventional double caster. In all such embodiments the device functionally retains its single wheel or single roller character.

It is one object of this invention to provide means for moving bulky compartmentalized structures without unloading or disassembling such structures.

It is another object of this invention to provide means for moving bulky structures which provide, when employed in a series, a plurality of independent supports adapted for positioning about the perimeter of the object so as to prevent structural warping or distortion.

These and other objects and advantages of the invention will be better understood from the following description when taken in conjunction with the accompanying drawings. In the drawings like reference numerals have been utilized to indicate like parts throughout.

FIGURE 1 is a perspective view of a portion of a multi-section, compartmentalized structure, i.e. a storage bin, in a position of rest with three separate and identical units of one embodiment of the invention attached thereto in position for lifting and moving the structure.

FIGURE 2 is a fragmentary side view of the storage bin and one of the unicycle-lifts as viewed along line 2—2 of FIGURE 1.

FIGURE 3 is a plan view of this embodiment of the unicycle-lift taken at line 3—3 of FIGURE 1.

FIGURE 4 is a plan view of this embodiment taken at line 4—4 of FIGURE 1.

FIGURE 5 is a fragmentary view of the storage bin and one lift in larger scale than in FIGURE 1 showing in side elevation the load engaging member of this embodiment attached by bolts to the storage bin, and, in engaged position with the load engaging member, a fragmentary view in side elevation of that portion of the lifting jack element which includes the actuating mechanism thereof.

FIGURE 6 is a perspective view to still larger scale of the load engaging member shown in FIGURES 1 and 5.

FIGURE 7 is a perspective view of the lower positioning means or spacer guide and support associated with the lower portion of this embodiment of the invention as shown in FIGURES 1 and 2.

Referring first to FIGURES 1 and 2 of the drawings, there can be seen one end of a multi-section storage cabinet 11 at rest upon a floor 12. Cabinet 11 consists of an upright end member 13, an intermediate, upright support member 14, a plurality of adjustable shelf members 15 positioned between and supported by end member 13 and intermediate upright support member 14, a plurality of adjustable shelf members 16 positioned between and supported by upright support member 14 and another upright support member, not shown, which may be another intermediate upright support member or may constitute opposite end member corresponding to end member 13.

Each of the upright end members and intermediate upright members as here shown is identical in shape and construction. In complete assembly each such upright comprises a modified I-shaped structure having an elongated, sheet-like central member 17 and wing support members 18 and 19 aligned in perpendicular relationship to the central member. Wing support members 18 and 19 are essentially T-shaped members and each bears a row of holes 21 which coincide with similar holes 30 in the central member 17. Wing members 18 and 19 can be welded or bolted to central member 17, or, as here, they can be riveted to the central member by passing rivets as exemplified by rivet 20, see FIGURE 3, through some of the holes 21 and the corresponding holes 30 in the central member 17. However, the primary purpose of the holes 21 is to provide means for positioning and supporting shelves 15 which are equipped with pins, not shown, at either end. Unicycle-lifts 22, 23, and 24 as here shown are separate and identical units adapted to raise and convey cabinet 11 to a new location.

Each unicycle-lift comprises a caster unit 25 and a lifting jack unit 26 rigidly affixed thereto.

Caster 25 is a conventional single wheel caster and consists of a wheel 27 mounted in a frame element 28 which in turn is supported by and rotatable within caster base 29. Wheel 27 and frame element 28 are thus free to swivel about an axis that is perpendicular to the transverse axis of wheel 27.

Lifting jack unit 26 comprises a base 31, a rack bar 32, a housing 33 including therein the actuating mechanism 34, a load engaging member 35 and an adjustable spacer and support member 36. In this embodiment rack bar 32, housing 33, and actuating mechanism 34 are conventional automobile bumper jack components. The exact design of these components may vary in accordance with established lifting systems, e.g., ratchet, hydraulic, pneumatic, or jackscrew. Their size and strength are dependent upon the intended use and it is requisite that each be adapted for positioning and operating alongside the object to be moved. A rack bar, housing and actuating mechanism of the type used in the embodiment shown are described in detail by M. B. Lucker in U.S. Patent 2,962,261 which description is to be considered incorporated herein by reference. Base 31 can be a conventional jack base and is adapted to support rack bar 32 in an upright position when in use. Base 31 can be welded to the rack bar as shown in the drawings. Other means of connection between base and rack bar can be used which provide the strength and stability compatible with the intended use. The load engaging member is designed in accordance with the shape and construction of the object or objects to be moved. In this embodiment load engaging member 35 is adapted to straddle one of the wing support members, 18 or 19, of the upright members of cabinet 11. As shown more clearly in FIGURE 6 load engaging member 35 comprises two side members 37 and 38 which grip the object to be moved and which are separated by a lift rod 39 to which they are rigidly affixed, e.g., as by welding. Rod 39 is adapted for engagement with the actuating mechanism of the jack and it is against such rod that this mechanism works when a load is being lifted. In this embodiment each of the side members 37 and 38 are in the shape of an elongated U with holes in each tip portion thereof aligned with corresponding holes in the mating member. Side members 37 and 38 are thus adapted for bolting together near the ends opposite rod 39 as indicated in FIGURE 6 by bolts 41 and 42, and taps 43 and 44.

In FIGURES 1 and 5 the load engaging member 35 is shown secured to cabinet 11 with each of bolts 41 and 42 passing through one of the holes 21 extending through end support member 13. As aforementioned the shape of load engaging member 35 may vary with the shape of the object to be moved. It should be adapted to securely grip the object to be moved on or near its perimeter or other extremity. It must provide a firm or rigid surface for the actuating mechanism of the jack to lift against. It is within the scope of this invention to provide connection between the load engaging member and the object to be moved by various means other than the bolting arrangement here shown, e.g., friction, pressure, or magnetic gripping. It is also within the scope of this invention to provide indirect connection between this member and the load where convenience dictates as by interposing strapping or framing elements between the device of this invention and the object.

Actuating mechanism 34 aforementioned is a conventional unit available in the market place in a variety of forms. Since the detailed working parts of any particular embodiment of this mechanism and their various movements do not per se comprise a part of this invention the description herein will be brief. Referring now to FIGURE 5, the actuating mechanism 34 includes a handle 45 shaped to receive a rod 46 and is pivoted on housing 33 as at 47. Handle 45 has also pivoted thereto as at 48 an upper pawl 49. A lower pawl 50 is pivoted to handle 45 as at 51. A spring 60 is pivotably connected to each of the aforementioned upper and lower pawls. During a lifting operation of the actuating mechanism 34 the upper and lower pawls are urged into engagement with rack bar 32 by a finger 52 pivotably mounted on housing 33 as at 53 and pressing against the aforementioned spring. In a lifting operation upper pawl 49 is first engaged on a tooth 55 of Y-shaped rack bar 32 and rod 46 and handle 45 are lifted upwardly. This lifts the lower pawl 50 upwardly to the next tooth 55 on rack bar 32 and raises the housing 33 which includes load support 56. Rod 46 and handle 45 are then pushed downwardly to move upper pawl 49 upwardly to engage the next higher tooth 55 on rack bar 32 with the lower pawl remaining in engagement with the tooth to which it moved in the last previous upward movement of handle 45. This cycle of operation is thereafter repeated to raise housing 33 and load lifting member 56 upwardly along rack bar 32.

Proper operation of spring 60 is insured by the interior design of housing 33 which urges the spring and the lower pawl into operating position.

To lower housing 33 and load support 56 finger 52 is rotated in a counterclockwise direction until its nose is out of engagement with the aforementioned spring connecting the upper and lower pawls. This then reverses the operation of the ratchet mechanism and permits lowering of the jack. Finger 52 therefore also serves as a locking member when the object to be moved has been raised to the proper height. Other locking means are provided in other embodiments.

FIGURE 4 provides a plan or top view of the actuating mechanism 34 in engagement with the rack bar 32 and with the load lifting member in position beneath rod 39 of load engaging member 35.

It is desirable in the use of this invention to actuate the general lift mechanisms employed so that all portions of the load are raised in an essentially simultaneous manner to maintain the object in balance at all times. This can be effected by using separate operators for each unicycle-lift or alternately raising each operating mechanism in small increments.

Referring now to FIGURES 2, 3, and 7 attention is directed to spacer and support member 36. The primary function of spacer 36 is to maintain a predetermined distance between the lower part of the unicycle-lift device and the object to be moved. Secondarily this element lends stability and support to both the lifting and rolling operations of the device. In the embodiment here employed, best seen in FIGURE 7, spacer 36 comprises a pair of complementary side members 61 and 62 adapted to receive therethrough bolts 63 and 64 which are equipped with washers 65 and 66 and taps 67 and 68 respectively. Side members 61 and 62 have curved end portions 71 and 72 adapted to receive T shaped wing support 18 and to close around the same when tap 67 is turned on bolt 63 in a direction which exerts pressure upon sides 61 and 62 so as to cause them to move toward each other. The opposite ends of sides 61 and 62 here designated as 73 and 74 are adapted to close upon rack bar 32 and grip the same when tap 68 is turned in the proper direction upon bolt 64. Since wing support 18 will be raised in relation to the gripped portion of rack bar 32 during the lifting operation the spacer 36 is slidably engaged with wing support 18 allowing it to move along wing support 18 as the latter is raised. FIGURE 2 shows a side elevation view of spacer 36 secured to rack bar 32 and wing support 18. FIGURE 3 shows a top or plan view of the same.

In moving a bulky object with the device of this invention the requisite number of unicycle lifts are positioned about the perimeter of the object to be moved and secured to the object either directly or indirectly. The object is then lifted by the several individual lifts which are actuated so as to maintain the object in balance and in essentially the same position the object assumes when in its normal position of rest. The object and the several unicycle lifts employed are then rolled to the relocation site, the object is again lowered to its intended support by reversing the lifting means, and finally the lifting and moving devices are removed and stored for future use.

It is to be understood that the term "perimeter" is used herein in its broadest sense and hence is used in relation to the exterior boundaries of objects having both circular and non-circular configurations.

It will be understood that the invention is not to be limited to the exact construction shown and described, but that various changes and modifications may be made without departing from the spirit and scope of the invention, as defined in the appended claims.

We claim:

1. A device for use in moving a structural object, said device consisting of lift means and a caster having a single roll element, said lift means comprising a base member and a lift jack mounted on and rigidly supported by said base member, said lift jack comprising a rack bar, load engaging means adapted to be detachably secured to said object, load lifting means movably mounted on said rack bar and adapted to engage said load engaging means and to work against said rack bar and said load engaging means when said load engaging means, said load lifting means and said rack bar are operatively connected, and adjusatble positioning means mounted on said rack bar and adapted to slidably engage said object and hold said object in fixed lateral relationship to said rack bar, said caster being mounted on said base member opposite said lift jack.

2. A device for use in moving a structural object, said device consisting of lift means and a caster having a single roll element, said lift means comprising a base member and a lift jack mounted on and rigidly supported by said base member, said lift jack comprising a rigid support member, load engaging means adapted to be detachably secured to said object, load lifting means movably mounted on said rigid support member and adapted to engage said load engaging means and to work against said rigid support member and said load engaging means when said load engaging means, said load lifting means and said rigid support member are operatively connected, and adjustable positioning means mounted on said rigid support member and adapted to slidably engage said object and hold said object in fixed lateral relationship to said rigid support member, said caster being mounted on said base member opposite said lift jack.

3. A device for use in moving a structural object, said device consisting of lift means comprising a base member and a lift jack mounted on and rigidly supported by said base member, and a single roll means mounted on said base member opposite said lift jack and rotatable in relation to said base member in a first plane, said lift jack comprising a rack bar, load engaging means adapted to be detachably secured to said object, load lifting means movably mounted on said rack bar and adapted to engage said load engaging means and to work against said rack bar and said load engaging means when said load engaging means, said load lifting means and said rack bar are operatively connected, and adjustable positioning means mounted on said rack bar and adapted to slidably engage said object and hold said object in fixed lateral relationship to said rack bar, said roll means having a roll support element and a single roll element rotatably supported by said roll support element and rotatable in a plane perpendicular to said first plane.

4. A device for use in moving a structural object, said device consisting of lift means comprising a base member and a lift jack mounted on and rigidly supported by said base member, and a single roll means mounted on said base member opposite said lift jack and rotatable in relation to said base member in a first plane, said lift jack comprising a rigid support member, load engaging means adapted to be detachably secured to said object, load lifting means movably mounted on said rigid support member and adapted to engage said load engaging means and to work against said rigid support member and said load engaging means when said load engaging means, said load lifting means and said rigid support member are operatively connected, and adjustable positioning means mounted on said rigid support member and adapted to slidably engage said object and hold said object in fixed lateral relationship to said rigid support member, said roll means having a roll support element and a single roll element rotatable in a plane perpendicular to said first plane.

References Cited by the Examiner

UNITED STATES PATENTS

| 949,331 | 2/10 | Scholle | 254—2.4 |
|---|---|---|---|
| 1,067,625 | 7/13 | Smith. | |
| 1,520,630 | 12/24 | Bateman | 214—390 |
| 1,614,579 | 1/27 | Twyman | 254—1 X |
| 2,463,381 | 3/49 | Hicks | 254—2.2 |
| 2,473,873 | 6/49 | Fosbender | 254—2.2 X |
| 2,636,623 | 4/53 | Corley | 254—2.2 X |
| 2,823,010 | 2/58 | Baxendell | 254—2.2 |
| 2,993,679 | 7/61 | Morgan | 254—89 |

FOREIGN PATENTS

| 206,836 | 3/57 | Australia. |
|---|---|---|
| 846,533 | 6/39 | France. |

DONLEY J. STOCKING, *Primary Examiner.*